(12) United States Patent
Knowlden

(10) Patent No.: US 7,641,223 B2
(45) Date of Patent: Jan. 5, 2010

(54) KNEE AIRBAG APPARATUS FOR A MOTORIZED VEHICLE

(75) Inventor: Leo S. Knowlden, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 13 days.

(21) Appl. No.: 11/952,251

(22) Filed: Dec. 7, 2007

(65) Prior Publication Data

US 2009/0146400 A1 Jun. 11, 2009

(51) Int. Cl.
*B60R 21/16* (2006.01)
(52) U.S. Cl. .................... 280/728.3; 280/732
(58) Field of Classification Search .............. 280/728.3, 280/730.2, 732, 752, 730.1
See application file for complete search history.

(56) References Cited

U.S. PATENT DOCUMENTS

| | | | | |
|---|---|---|---|---|
| 3,951,427 A | * | 4/1976 | Wilfert | 280/732 |
| 5,839,756 A | * | 11/1998 | Schenck et al. | 280/743.1 |
| 5,895,069 A | * | 4/1999 | Heilig et al. | 280/730.1 |
| 5,971,431 A | * | 10/1999 | Wohllebe et al. | 280/732 |
| 6,092,836 A | * | 7/2000 | Saslecov | 280/730.1 |
| 6,464,255 B1 | * | 10/2002 | Preisler et al. | 280/752 |
| 7,175,195 B2 | * | 2/2007 | Morita | 280/730.1 |
| 7,261,318 B2 | * | 8/2007 | Enders | 280/732 |

* cited by examiner

*Primary Examiner*—Faye M. Fleming
(74) *Attorney, Agent, or Firm*—Quinn Law Group, PLLC

(57) ABSTRACT

A supplemental inflatable restraint system (SIR) is provided for use with a vehicle having a passenger compartment with an instrument panel at a forward end therein. The SIR includes a cavity having an opening formed in a lower portion of the instrument panel. An inflatable cushion is operable to transition through the opening from a non-expanded state, in which the cushion is inside the cavity, to an expanded state, in which the cushion is substantially outside the cavity. A fluid dispensing apparatus is operable to regulate transition of the cushion from the non-expanded state to the expanded state. A hush panel is attached to the lower portion of the instrument panel such that the panel is not visible to a vehicle occupant seated upright and adjacent thereto. The hush panel is configured to cover the opening, and is characterized by the absence of an outer surface with an appearance finish.

20 Claims, 2 Drawing Sheets

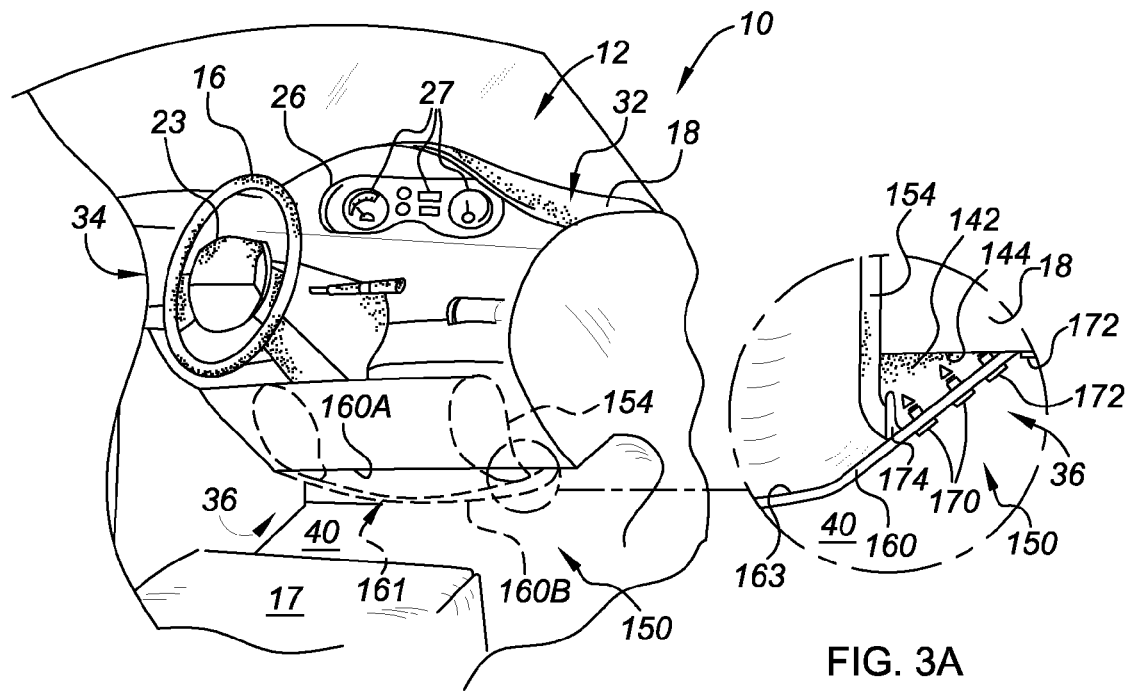
FIG. 3
FIG. 3A
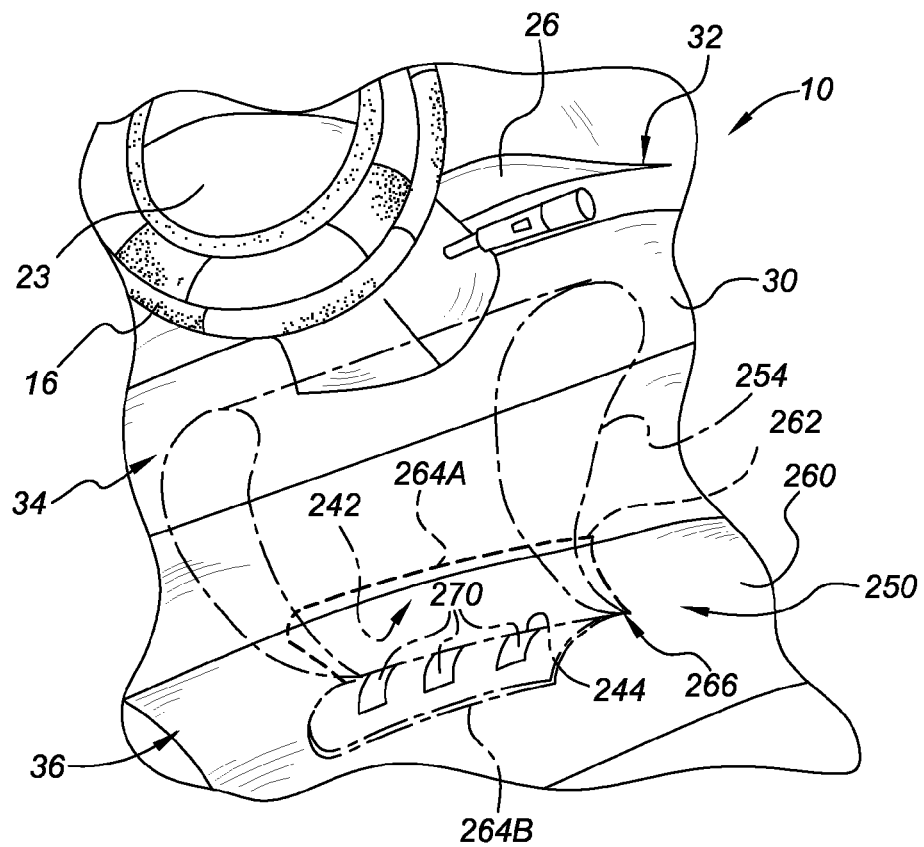
FIG. 4

KNEE AIRBAG APPARATUS FOR A MOTORIZED VEHICLE

TECHNICAL FIELD

The present invention relates generally to inflatable restraint systems for use in motorized vehicles, and more particularly to supplemental inflatable restraint systems deployable for the knees and lower extremities.

BACKGROUND OF THE INVENTION

Inflatable airbag devices, which are now more commonly referred to in the art as Supplementary Restraint Systems (SRS), Air Cushion Restraint Systems (ACRS), or Supplemental Inflatable Restraint (SIR) Systems, are originally equipped in almost all present day motorized vehicles. Airbag devices are generally located in the passenger compartment of automotive vehicles, and act as a selectively deployable cushion capable of attenuating kinetic energy.

Traditional airbag devices comprise an inflatable airbag module stored either behind the vehicle instrument panel (e.g., for passenger-side airbags), or mounted to the steering wheel hub (e.g., for driver-side airbags). A plurality of sensors or similar devices is strategically located to detect the onset of a predetermined event. The sensor(s) responsively activates an inflation device, internally located in the airbag module, to produce a flow of inflating gas into an inflatable flexible membrane (i.e., an airbag cushion), also located within the airbag module. This causes the airbag cushion to be deployed in a rearward direction within the vehicle passenger compartment.

Many automotive vehicles are currently being designed with a supplemental inflatable restraint system located on a downward and forwardly inclined portion of the instrument panel, commonly identified as the "knee bolster". The knee airbag can be extended so as to restrain the lower half of the occupant. During a predetermined event, the knee airbag is inflated, traditionally passing or breaking through a rearward-facing, exterior show surface of the knee bolster, in a manner similar to that described above.

SUMMARY OF THE INVENTION

The present invention provides a supplemental inflatable restraint (SIR) system for use with a motorized vehicle having a passenger compartment with an instrument panel at a forward end therein. The instrument panel has an upper and a lower portion, with a middle portion extending therebetween. The instrument panel defines a cavity therein, with an opening formed in the lower portion thereof. An inflatable cushion is operable to transition through the opening from a non-expanded state, in which the cushion is inside the cavity, to an expanded state, in which the cushion is substantially outside the cavity. A fluid dispensing apparatus is in fluid communication with the cushion to selectively regulate transition of the cushion from the non-expanded state to the expanded state.

A panel member is attached to the cavity such that the panel member is substantially nonvisible to a vehicle occupant seated upright and adjacent thereto. The panel member is configured to substantially cover the instrument panel cavity opening, and is preferably characterized by the absence of an outer surface with an appearance finish. As used herein, the term "appearance finish" should be defined or interpreted to indicate a surface refinement such as, but not limited to, a coating, varnish, paint, polish, shine, glaze, texturing, staining, topical treatment or laminate, and a leather or cloth wrapping. Ideally, the cushion is in operative communication with the panel member to transition the panel member from a first substantially closed position to a second generally open position.

In one aspect of the present invention, the panel member pivots about a laterally oriented hinge portion to transition from the first substantially closed position to the second generally open position. In one instance, the panel member includes a tear seam defined by a plurality of indentations or slots operatively configured to weaken the panel member at preselected locations. To this regard, a bendable scrim or metallic strip is preferably attached to the panel member to provide reinforcement to the hinge when the panel member transitions to the second generally open position. Alternatively, the panel member includes a closeout door for transitioning from the first substantially closed position to the second generally open position. In this instance, the laterally oriented hinge portion is either a butt hinge or a plurality of fasteners, rivets, screws, or bolts. Preferably, the closeout door includes a rounded edge portion disposed in a rearward orientation relative to the vehicle.

In another aspect of the present invention, a rearward portion of the panel member flexes away from the instrument panel to transition from the first substantially closed position to the second generally open position. In this particular instance, the SIR system preferably includes a plurality of releasing fasteners that are each configured to temporarily retain the panel member in the first closed position at preselected locations. In a similar regard, a plurality of non-releasing fasteners are also included, each configured to continuously retain the panel member in the first closed position at preselected locations. One or more protrusions that extend generally vertically from an inner surface of the panel member are preferably included to prevent the cushion from contacting the plurality of releasing fasteners and the plurality of non-releasing fasteners when transitioning from the non-expanded state to the expanded state.

The present invention also provides a knee airbag apparatus for use with a motorized vehicle having an instrument panel with upper and a lower portions that each extend in a rearward direction relative to the motorized vehicle, with a middle portion extending therebetween. The instrument panel defines a cavity therein with an opening formed in the lower portion thereof, the opening facing in a generally downward direction. An inflatable cushion is operable to transition through the opening from a non-expanded state, in which the cushion is inside the cavity, to an expanded state, in which the cushion is substantially outside the cavity. A fluid dispensing apparatus is in fluid communication with the cushion to selectively regulate transition of the cushion from the non-expanded state to the expanded state.

A hush panel is operatively attached to the lower portion of the instrument panel to substantially cover the cavity opening. The hush panel is characterized by the absence of an outer surface with an appearance finish. The cushion is in operative communication with the hush panel to transition the hush panel from a first substantially closed position to a second generally open position. Ideally, the hush panel is substantially nonvisible to a vehicle occupant seated upright and adjacent thereto.

The present invention further provides a motorized vehicle, which includes an instrument panel disposed at a forward end therein. The instrument panel has upper and lower portions extending rearward relative to the vehicle, with a middle portion extending therebetween. The instrument panel defines a cavity in the lower portion thereof. The cavity has an opening facing in a generally downward direction. An inflatable cushion is operable to transition through the opening from a non-expanded state, in which the cushion is inside the cavity, to an expanded state, in which the cushion is substantially outside the cavity. A fluid dispensing apparatus is in fluid communication with the cushion to selectively regulate transition of the cushion from the non-expanded state to the expanded state.

A hush panel is attached to the lower portion of the instrument panel and configured to substantially cover the cavity opening. Notably, the upper portion of the exterior surface has an appearance finish, whereas the lower portion of the exterior surface and the hush panel are characterized by the absence of a surface with an appearance finish. The cushion is operable to transition the hush panel from a first substantially closed position to a second generally open position. Finally, the hush panel must be substantially nonvisible to a vehicle occupant seated upright and adjacent thereto.

The above features and advantages, and other features and advantages of the present invention, will be readily apparent from the following detailed description of the preferred embodiments and best modes for carrying out the present invention when taken in connection with the accompanying drawings.

BRIEF DESCRIPTION OF THE DRAWINGS

FIG. 3 is an elevated perspective illustration of the instrument panel of FIG. 1 illustrating a knee airbag apparatus deployable through a hush panel in accordance with an alternate embodiment of the present invention;

FIG. 3A is a front perspective illustration of a portion of the knee airbag apparatus and hush panel of FIG. 3; and FIG. 4 is a perspective illustration of the instrument panel of FIG. 1 illustrating a knee airbag apparatus deployable through a hush panel in accordance with another alternate embodiment of the present invention.

DESCRIPTION OF THE PREFERRED EMBODIMENTS

Figure 1:
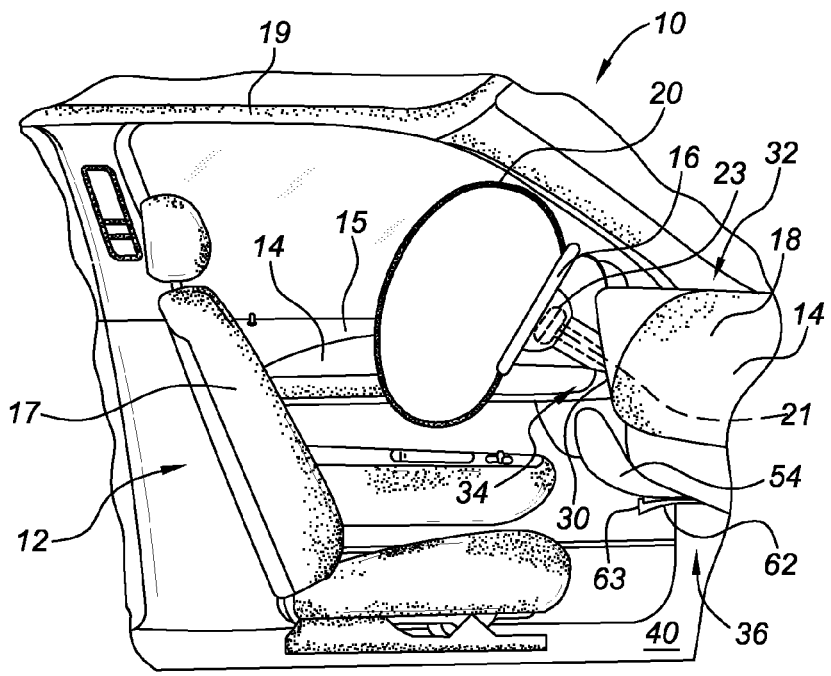
FIG. 1 is a side-view illustration inside of the passenger compartment of a representative motorized vehicle for using the supplemental inflatable restraint systems of the present invention.

Referring to the Figures, wherein like reference numerals refer to like components throughout the several views, FIG. 1 shows an exemplary motor vehicle, indicated generally at 10, for using the supplemental inflatable restraint (SIR) systems of the present invention. The vehicle 10 includes an interior compartment—i.e., a passenger compartment, shown generally at 12, and vehicle interior structure, partially identified as 14. The vehicle interior structure 14 includes, but is certainly not limited to, one or more door assemblies 15, a steering wheel 16, one or more seat assemblies 17, an instrument panel 18, and a headliner 19. The instrument panel 18 houses, for example at the driver side, an array of gauges (also known as an "instrument cluster"), shown in FIG. 2 at 26, including a speedometer, odometer, and tachometer (shown collectively in FIG. 3 as indicated by reference numeral 27) or, at the front passenger side, a glove compartment and heating, air conditioning, and ventilation (HVAC) ports (neither of which are shown). A traditional "driver-side" airbag assembly is shown in FIG. 1 in an inflated condition as an inflatable cushion 20 extending from an airbag module 21 mounted to a wheel hub 23 of the steering wheel 16.

The instrument panel 18 includes an exterior surface 30 having upper, middle, and lower portions 32, 34 and 36, respectively. As can be seen in FIG. 1, the upper and lower portions 32, 36 extend in a generally rearward direction relative to the vehicle 10, with the middle portion 34 extending therebetween in a generally vertical orientation. Of notable importance, the upper and middle portions 32, 34 of the instrument panel exterior surface 30 are defined as "A-Surfaces", generally characterized as having an aesthetically appealing, customer visible appearance finish. In direct contrast, the lower (underside) portion 36 of the instrument panel exterior surface 30 is defined as a "B-Surface", generally characterized as not having an appearance finish. As used herein, the term "appearance finish" should be defined or interpreted to indicate a surface refinement such as, but not limited to, a coating, varnish, paint, polish, shine, glaze, texturing, staining, topical treatment or laminate, and a leather or cloth wrapping.

Figure 2:
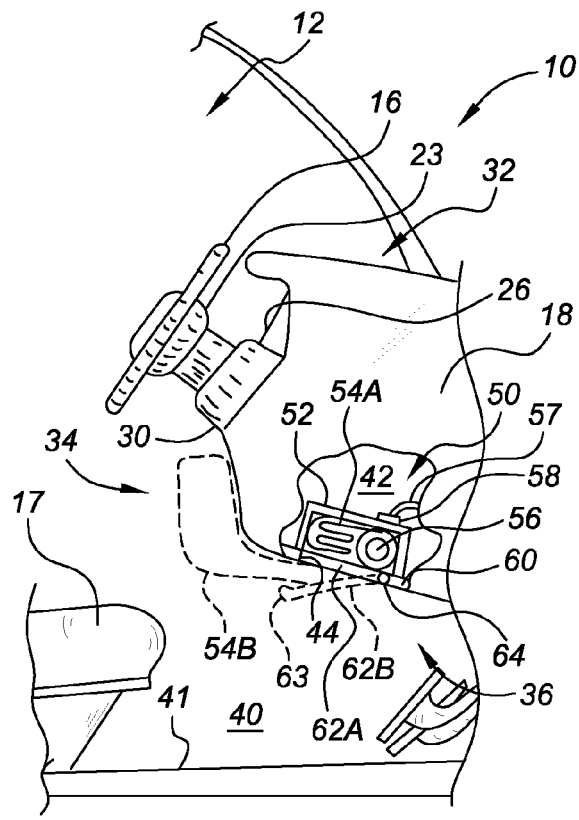
FIG. 2 is a side-view illustration of the instrument panel of FIG. 1 partially broken away to illustrate a knee airbag apparatus deployable through a hush panel in accordance with one embodiment of the present invention.

Turning to FIG. 2, a side-view of the instrument panel 18 of FIG. 1 is shown partially broken away to illustrate a supplemental inflatable restraint system or knee airbag apparatus, indicated generally at 50, in accordance with one embodiment of the present invention. The knee airbag apparatus 50 is oriented at the lower portion 36 of the instrument panel 18, along an underside transition portion, generally facing foot space 40. The knee airbag apparatus 50 includes an inflatable cushion or flexible membrane 54 and an inflation fluid dispensing apparatus 56 attached to a housing 52, which is mounted, e.g., via bolts, inside of an instrument panel cavity 42. As seen in FIG. 2, the instrument panel cavity 42 has an opening 44 formed in the lower portion 36 of the exterior surface 30 of the instrument panel 18, which faces in a generally downward direction.

A hush panel 60 (which may also be referred to herein as a closeout panel or a panel member) is operatively attached, e.g., via welding, fastening, or riveting, to the lower portion 36 of the instrument panel 18 to at least partially cover the cavity opening 44 and, thus, the knee airbag apparatus 50. As a section of the lower portion 36 of the instrument panel exterior surface 30, the hush panel 60 is also defined as a "B-Surface" and, thus, generally characterized as not having an appearance finish. The hush panel 60 is oriented along the instrument panel 18 such that it remains substantially nonvisible to a vehicle occupant (not shown) seated upright and adjacent thereto—e.g., in seat assembly 17. In other words, the hush panel 60 is positioned low and forward enough (e.g., 330 millimeters (mm) from the passenger compartment floor 41 and generally parallel thereto) in the interior compartment 12 such that the normally seated occupant will not be able to see the hush panel 60—i.e., below the sightline of the instrument panel 18.

A mounting ring 58 defines an opening (not shown) that operatively mates with an opening (also not shown) defined by the cushion 54. An inflator nozzle 57 of the inflation fluid dispensing apparatus 56 extends through the openings defined by the mounting ring 58 and cushion 54 such that the inflation fluid dispensing apparatus 56 is in fluid communication with the cushion 54. Sensors (not shown) mounted to the vehicle 10 may be connected in signaling communication (e.g., via electronic cabling, radio frequency and other wireless technology, etc.) with the inflation fluid dispensing apparatus 56. Under certain predetermined conditions, the sensors emit a signal(s) to the inflation fluid dispensing apparatus 56 to regulate inflation of the cushion 54, as will be described below. The knee airbag apparatus may be used in conjunction with, or independent of the airbag assembly—i.e., inflatable cushion 20 and airbag module 21 of FIG. 1.

The inflation fluid dispensing apparatus 56 is selectively actuatable to provide a fluid, preferably a pressurized gas such as nitrogen, argon, or carbon dioxide, for deploying the cushion 54 outward into the interior compartment 12 of FIG. 2. For example, the inflatable cushion 54 is shown in a first, non-expanded state with solid lines at 54A in FIG. 2, wherein the inflatable cushion 54 is inside the cavity 42 in a generally folded condition. The inflatable cushion 54 is also shown in a second, expanded state with hidden lines, indicated at 54B in FIG. 2, in which the inflatable cushion 54 extends through the cavity opening 44, in an inflated condition outside the cavity 42. The cushion 54 functions to transition the hush panel 60 from a first, substantially closed position to a second, generally open position, as will be readily understood from the description provided hereinbelow.

According to the embodiment of FIG. 2, the hush panel 60 includes a B-surface, closeout door 62 with a rounded edge portion 63 disposed in a rearward orientation relative to the vehicle 10. The closeout door 62 is shown in a first, substantially closed position with solid lines at 62A in FIG. 2. Upon inflation of the inflatable cushion 54, the closeout door 62 is pushed, pressed, or forced to a second, generally open position, indicated in FIG. 2 with hidden lines at 62B. The closeout door 62 rotates or pivots about a laterally oriented hinge portion 64 to transition from the first position 62A to the second position 62B. In this particular embodiment, the laterally oriented hinge portion 64 is preferably either a butt hinge (as seen in FIG. 2), or a plurality of fasteners, rivets, screws, or bolts (not shown herein).

FIGS. 3 and 4 illustrate separate embodiments of the present invention that function similarly to the previously described knee airbag apparatus 50 of FIG. 2, but include, among other things, variations in the configuration the hush panel 60. For simplicity and brevity, like reference numbers are used in FIGS. 3 and 4 to refer to like components from FIGS. 1 and 2. Correspondingly, the components of FIGS. 3 and 4 that are identified with a common reference number to a respective component of FIGS. 1 and 2 should be considered identical unless specified otherwise. Furthermore, the embodiments depicted in FIGS. 3 and 4, like FIGS. 1 and 2, are not to scale and are provided purely for clarification and explanation purposes. As such, the particular dimensions of the drawings presented herein are not to be considered limiting.

FIG. 3 of the drawings illustrates a knee airbag apparatus, indicated generally at 150, which is deployable through a hush panel 160 in accordance with an alternate embodiment of the present invention. Similar to the knee airbag apparatus 50 of FIG. 2, the knee airbag apparatus 150 of FIG. 3 is oriented at the lower portion 36 of the instrument panel 18, along an underside transition portion, generally facing foot space 40. The knee airbag apparatus 150 includes an inflatable cushion 154 stowed inside of an instrument panel cavity 142. The instrument panel cavity 142 has an opening 144 formed in the lower portion 36 of the exterior surface 30 of the instrument panel 18, as best seen in FIG. 3A.

Functioning in a manner similar to the knee airbag apparatus 50 of FIG. 2, an inflation fluid dispensing apparatus (not shown in FIG. 3, but preferably identical in nature to the inflation fluid dispensing apparatus 56 of FIG. 1) is in fluid communication with the cushion 154 to regulate inflation of the cushion 154. Specifically, the inflation fluid dispensing apparatus is selectively actuatable to provide a fluid for deploying the cushion 154 outward into the interior compartment 12 of FIG. 3. By way of example, the inflatable cushion 154 is operable to transition from a first, non-expanded state (not shown), wherein the inflatable cushion is inside the cavity 142 in a generally folded condition, to a second, expanded state, in which the inflatable cushion 154 is substantially outside the cavity 142 in an inflated condition (shown with hidden lines in FIG. 3).

The hush panel 160 is operatively attached to the lower portion 36 of the instrument panel 18 to at least partially cover the knee airbag apparatus 150. Synonymous to the hush panel 60 of FIG. 2, the hush panel 160 of FIG. 3 is defined as a "B-Surface", generally characterized as not having an appearance finish. Furthermore, the hush panel 160 is oriented along the instrument panel 18 such that it remains substantially nonvisible to a vehicle occupant (not shown) seated upright and adjacent thereto—e.g., in seat assembly 17.

The cushion 154 functions to transition the hush panel 160 from a first, substantially closed position (shown with solid lines at 160A in FIG. 3) to a second, generally open position (shown with hidden lines at 160B in FIG. 3). In this particular embodiment, a rearward portion 161 of the hush panel 160 flexes or bends away from the instrument panel 18 to transition from the first, substantially closed position 160A to the second, generally open position 160B. Put another way, during inflation of the cushion 154, the cushion 154 progressively inflates as a result of the introduction of inflation fluid by a dispensing apparatus, such as inflation fluid dispensing apparatus 56 of FIG. 2. This operation presses the expanding cushion 154 against an inner surface 163 of the hush panel 160, causing the instrument panel 18 to spread or "burp", allowing for the full inflation of the cushion 154.

Ideally, the knee airbag assembly 150 embodied in FIG. 3 includes a plurality of releasing fasteners 170, FIG. 3A, that function to temporarily retain the hush panel 160 in the first closed position at preselected locations. In a similar respect, a plurality of non-releasing fasteners 172 are also included to continuously retain the hush panel 160 in the first closed position at preselected locations. In this particular scenario, one or more protrusions 174 preferably extend generally vertically from the inner surface 163 of the hush panel 160. The protrusions 174 are shaped and oriented so as to prevent the cushion 154 from contacting either the plurality of releasing fasteners 170 or the plurality of non-releasing fasteners 172 when transitioning from the non-expanded state to the expanded state.

Turning now to FIG. 4 of the drawings, a knee airbag apparatus is indicated generally at 250 in accordance with another alternate embodiment of the present invention. Similar to the knee airbag apparatus 50 and 150 of FIGS. 2 and 3, respectively, the knee airbag apparatus 250 of FIG. 4 is oriented at the lower portion 36 of the instrument carrier 18, along an underside transition portion, generally facing foot space 40. The knee airbag apparatus 250 includes an inflatable cushion 254 stowed inside of an instrument panel cavity 242. The instrument panel cavity 242 has an opening 244 formed in the lower portion 36 of the exterior surface 30 of the instrument panel 18.

A hush panel 260 is operatively attached to the lower portion 36 of the instrument panel 18 to at least partially cover the knee airbag apparatus 250. Synonymous to the hush panels 60 of FIG. 2 and 160 of FIG. 3, the hush panel 260 of FIG. 4 is defined as a "B-Surface", generally characterized as not having an appearance finish. Furthermore, the hush panel 260 is oriented along the instrument panel 18 such that it remains substantially nonvisible to a vehicle occupant (not shown) seated upright and adjacent thereto—e.g., in seat assembly 17 of FIG. 1.

An inflating device, such as inflation fluid dispensing apparatus 56 of FIG. 2, is in fluid communication with the inflatable cushion 254, and selectively actuatable to provide a fluid for deploying the cushion 254 outward into the vehicle passenger compartment, e.g., interior compartment 12 of FIG. 1. For example, the inflatable cushion 254 is operable to transition from a first, non-expanded state (not shown), wherein the inflatable cushion 254 is inside the cavity 242 in a generally folded condition. The inflatable cushion 254 is also shown in a second, expanded state with hidden lines, indicated at 54B in FIG. 2, in which the inflatable cushion 254 is substantially outside the cavity 242 in an inflated condition. The cushion 254 functions to transition the hush panel 260 from a first, substantially closed position to a second, generally open position, as will be readily understood from the description provided hereinbelow.

According to the embodiment of FIG. 4, the hush panel 260 includes a tear seam 262 (indicated with hidden lines in FIG. 4) defined by a plurality of indentations or slots that are configured to weaken the hush panel 260 at preselected locations. In other words, the opening 244 in the lower portion 36 of the instrument panel exterior surface 18 is created when the inflatable cushion 254 is expanded with sufficient force to break through the tear seam 262, creating a deployment door, which is shown in a first, substantially closed position with solid lines at 264A in FIG. 4. Upon inflation of the inflatable cushion 54, the deployment door 264A is pushed, pressed, or forced to a second, generally open position, indicated in FIG. 4 with shadow lines at 264B. The deployment door 264 rotates or pivots about a laterally oriented hinge portion, indicated generally at 266, to transition from the first position 264A to the second position 264B. According to preferred practices, the knee airbag apparatus 250 preferably includes at least one, but preferably a plurality of bendable scrim or metallic strips 270 that are attached to the hush panel 260, and thereby configured to reinforce the laterally oriented hinge portion 266.

While the best modes for carrying out the present invention have been described in detail herein, those familiar with the art to which this invention pertains will recognize various alternative designs and embodiments for practicing the invention within the scope of the appended claims.

The invention claimed is:

1. A supplemental inflatable restraint system for a motorized vehicle including a passenger compartment having an instrument panel at a forward end therein, the instrument panel having an upper, middle, and lower portion, the instrument panel defining a cavity therein with an opening formed in the lower portion, comprising:
    an inflatable cushion operable to transition through the opening from a non-expanded state in which said cushion is inside the cavity to an expanded state in which said cushion is substantially outside the cavity;
    a fluid dispensing apparatus in operative fluid communication with said cushion to selectively regulate transition of said cushion from said non-expanded state to said expanded state; and
    a panel member operatively attached to the lower portion of the instrument panel such that said panel member is substantially nonvisible to a vehicle occupant seated upright and adjacent thereto, said panel member configured to substantially cover the cavity opening, said opening generally facing a floor of the vehicle.

2. The supplemental inflatable restraint system of claim 1, wherein said panel member is characterized by the absence of an outer surface with an appearance finish.

3. The supplemental inflatable restraint system of claim 2, wherein said cushion is in operative communication with said panel member to transition said panel member from a first substantially closed position to a second generally open position.

4. The supplemental inflatable restraint system of claim 3, wherein said panel member pivots about a laterally oriented hinge portion to transition from said first substantially closed position to said second generally open position.

5. The supplemental inflatable restraint system of claim 4, wherein said panel member includes a tear seam defined by a plurality of indentations or slots operatively configured to weaken said panel member at preselected locations.

6. The supplemental inflatable restraint system of claim 5, further comprising:
    at least one of a bendable scrim or metallic strip operatively attached to said panel member and configured to reinforce said laterally oriented hinge portion.

7. The supplemental inflatable restraint system of claim 4, wherein said panel member includes a closeout door for transitioning from said first substantially closed position to said second generally open position, said closeout door having a rounded edge portion disposed in a rearward orientation relative to the vehicle.

8. The supplemental inflatable restraint system of claim 7, wherein said laterally oriented hinge portion comprises one of a butt hinge and a plurality of fasteners, rivets, screws, or bolts.

9. The supplemental inflatable restraint system of claim 3, wherein a rearward portion of said panel member flexes away from the instrument panel to transition from said first substantially closed position to said second generally open position.

10. The supplemental inflatable restraint system of claim 9, further comprising:
    a plurality of releasing fasteners operatively configured to temporarily retain said panel member in said first closed position at preselected locations; and
    a plurality of non-releasing fasteners operatively configured to continuously retain said panel member in said first closed position at preselected locations.

11. The supplemental inflatable restraint system of claim 10, further comprising:
    at least one protrusion extending generally vertically from an inner surface of said panel member and operatively configured to prevent said cushion from contacting said plurality of releasing fasteners and said plurality of non-releasing fasteners when transitioning from said non-expanded state to said expanded state.

12. A knee airbag apparatus for a motorized vehicle including an instrument panel with upper and lower portions extending in a rearward direction relative to the vehicle, and a middle portion extending therebetween, the instrument panel defining a cavity therein with an opening formed in the lower portion thereof facing in a generally downward direction, the knee airbag apparatus comprising:
    an inflatable cushion operable to transition through said opening from a non-expanded state in which said cushion is inside the cavity to an expanded state in which said cushion is substantially outside the cavity;
    a fluid dispensing apparatus in operative fluid communication with said cushion to selectively regulate transition of said cushion from said non-expanded state to said expanded state; and a hush panel operatively attached to the lower potion of the instrument panel and configured to substantially cover the cavity opening, said hush panel characterized by the absence of an outer surface with an appearance finish;

wherein said cushion is in operative communication with said hush panel to transition said hush panel from a first substantially closed position to a second generally open position.

13. The knee airbag apparatus of claim 12, wherein said hush panel is substantially nonvisible to a vehicle occupant seated upright and adjacent thereto.

14. The knee airbag apparatus of claim 12, wherein said hush panel pivots about a laterally oriented hinge portion to transition from said first substantially closed position to said second generally open position.

15. The knee airbag apparatus of claim 14, wherein said hush panel includes a tear seam defined by a plurality of indentations or slots operatively configured to weaken said hush panel at preselected locations.

16. The knee airbag apparatus of claim 15, farther comprising:
at least one of a bendable scrim or metallic strip operatively attached to said hush panel and configured to reinforce said laterally oriented hinge portion.

17. The knee airbag apparatus of claim 14, wherein said panel member includes a closeout door for transitioning from said first substantially closed position to said second generally open position, and wherein said laterally oriented hinge portion comprises one of a butt hinge and a plurality of fasteners, rivets, screws, or bolts.

18. The knee airbag apparatus of claim 12, wherein a rearward portion of said hush panel flexes away from the instrument panel to transition from said first substantially closed position to said second generally open position.

19. The knee airbag apparatus of claim 18, farther comprising:
a plurality of releasing fasteners operatively configured to temporarily retain said hush panel in said first closed position at preselected locations;
a plurality of non-releasing fasteners operatively configured to continuously retain said hush panel in said first closed position at preselected locations; and
at least one protrusion extending generally vertically from an inner surface of said hush panel and operatively configured to prevent said cushion from contacting said plurality of releasing fasteners and said plurality of non-releasing fasteners when transitioning from said non-expanded state to said expanded stat.

20. A motorized vehicle, comprising:
an instrument panel disposed at a forward end of the vehicle, said instrument panel having upper and lower portions extending rearward relative to the vehicle and a middle portion extending therebetween, said instrument panel defining a cavity in said lower portion with an opening formed in said lower portion facing in a generally downward direction;
an inflatable cushion operable to transition through said opening from a non-expanded state in which said cushion is inside said cavity to an expanded state in which said cushion is substantially outside said cavity;
a fluid dispensing apparatus in operative fluid communication with said cushion to selectively regulate transition of said cushion from said non-expanded state to said expanded state; and
a hush panel operatively attached to said instrument panel lower portion to substantially cover said cavity opening;
wherein said upper portion of said exterior surface is characterized by an appearance finish, and said lower portion of said exterior surface and said hush panel are characterized by the absence of an appearance finish;
wherein said cushion is in operative communication with said hush panel to transition said hush panel from a first substantially closed position to a second generally open position; and
wherein a rearward portion of said hush panel pivots about a laterally oriented hinge portion or flexes away from said instrument panel to transition from said first substantially closed position to said second generally open position.

* * * * *